Patented Nov. 11, 1952

2,617,804

UNITED STATES PATENT OFFICE 2,617,804

1-CARBOBENZOXY-4-SUBSTITUTED PIPERAZINES

Leon Goldman, River Edge, N. J., assignor to American Cyanamid Company, New York, N. Y., a corporation of Maine No Drawing. Application March 21, 1951, Serial No. 216,851

7 Claims. (Cl. 260—268)

This invention relates to new organic compounds and their preparation. More particularly, it relates to 1-carbobenzoxy-4-substituted piperazines.

The 1-carbobenzoxypiperazines of the present invention may be illustrated by the following general formula:

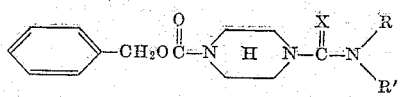

in which R is a member of the group consisting of hydrogen and lower alkyl radicals, R' is a member of the group consisting of hydrogen, alkyl, aryl, cycloalkyl and aralkyl radicals and X is a member of the group consisting of oxygen, sulfur and imino radicals. As used herein the term "lower alkyl radical" means a radical of 1 to 4 carbon atoms.

In general the compounds of the present invention are colorless crystalline solids. The compounds are, in general, slightly soluble in water but are readily soluble in benzene, lower aliphatic alcohols, chloroform, and the like. In the general formula when X is an imino radical water soluble addition salts may be formed.

The new compounds of the present invention may be prepared in several ways, the most desirable method being dependent to a large extent on the nature of the produce desired. In general, I prefer to prepare the compounds by reacting a 1-carbobenzoxypiperazine having the formula:

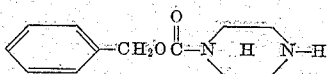

with any compound which is capable of introducing into the 4-position of the piperazine nucleus a group represented by

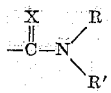

in which R, R' and X are as hereinbefore defined. The 1-carbobenzoxypiperazine is a new compound and a method for its preparation is given in the examples hereinafter. The acid salts of the 1-carbobenzoxypiperazine can obviously be used as starting material. In a reaction of this type wherein a halogen acid is liberated it is usually desirable to have present an acid-binding substance such as an alkali metal bicarbonate, alkali metal carbonate, alkali metal hydroxide or similar alkaline substance or an excess of the 1-carbobenzoxypiperazine.

The intermediates to be reacted with the 1-carbobenzoxypiperazine or acid salt thereof can be an alkali metal cyanate or a mono or dialkylcarbamyl halide or a nitrourea to produce the 1-carbobenzoxy-4-carbamylpiperazines. In producing 1-carbobenzoxy-4-thiocarbamyl piperazines I can use an alkali metal thiocyanate, an aliphatic isothiocyanate or a mono or dialkylthiocarbamyl chloride. The guanyl derivatives of 1-carbobenzoxypiperazine may be prepared by the reaction of a 1-carbobenzoxypiperazine salt with a cyanamide or they can also be prepared by reacting 1-carbobenzoxypiperazine with an S-alkyl isothiourea salt. These latter reactions can be carried out in a solvent such as an aqueous lower aliphatic alcohol.

The process of the present invention, in general is preferably carried out in a solvent although it can be carried out without a solvent where at least one of the intermediates are liquid. Temperatures of 5° to 100° C. are usually sufficient to complete the reaction in a reasonable length of time when water is used as the solvent. Generally the reaction is carried out at 20° C. to about 80° C. when aqueous alcoholic solvents are hydrocarbon solvents, such as benzene, are used. The specific conditions under which the reaction is carried out are dependent upon the group being introduced into the 4-position and also upon the reactivity of the 1-carbobenzoxypiperazine. For instance, 1-carbobenzoxypiperazine hydrochloride can be reacted in aqueous solution with potassium cyanate at room temperature or below to give 1-carbobenzoxy-4-carbamylpiperazine. However, when reacting 1-carbobenzoxypiperazine with phenylacethydroxamic acid benzoate in aqueous solution it is desirable to heat the reaction mixture at steam bath temperatures in order to complete the reaction.

In general, all of the compounds in which X of the general formula is oxygen may be prepared by another method such as reacting 1-carbobenzoxy-4-chlorocarbonylpiperazine with ammonia, a primary or secondary amine. As illustrated in the general formula, these primary or secondary amines may be compounds such as methylamine, dimethylamine, aniline, cyclohexylamine, benzylamine, etc. The 1-carbobenzoxy-4-chlorocarbamyl piperazine is a new compound and its preparation is described in the examples which follow.

A still further method for preparing the 1-carbobenzoxy-4-mono substituted carbamyl piperazine is the reaction of 1-carbobenzoxypiperazine with an aryl or alkyl isocyanate.

The compounds of the present invention generally possess marked activity as anticonvulsants, and may be useful for other purposes. In general, the compounds are characterized by their relatively low toxicity.

The following examples show in greater particularity the preparation of a number of 1-carbobenzoxy-4-substituted piperazines within the scope of the present invention.

EXAMPLE 1

1-carbobenzoxy-4-carbamylpiperazine

A mixture of 97 g. of piperazine hexahydrate in 750 ml. of methanol and 95 ml. of water was acidified to pH 3.5, in the presence of bromphenol blue, with 155 ml. of 6N hydrochloric acid. The resulting solution was stirred and 95 g. of a 90% solution of carbobenzoxy chloride in toluene and 220 ml. of 4N sodium hydroxide were added at rates which maintained the pH near 4.6; the final pH was 5.5. The resulting mixture was slowly brought to reflux, refluxed ½ hour, and let stand overnight. The methanol was removed under reduced pressure, the residual liquid was made alkaline with sodium hydroxide, anhydrous sodium carbonate was added, and the mixture extracted with 200 ml. and 2×100 ml. of chloroform. The chloroform extract was extracted with 250 ml. of dilute hydrochloric acid, and the chloroform extract was washed with water. The chloroform extracts were concentrated to dryness under reduced pressure, and crystallization of the residue from ethanol-ethyl acetate gave 9.0 g. of 1,4-dicarbobenzoxypiperazine, M. P. 109–112° C. When recrystallized from absolute ethanol colorless crystals were obtained having a melting point 112.0–113.0° C.

The acid aqueous extract was made alkaline with sodium hydroxide, and the oil which separated was extracted with 4×50 ml. of chloroform. The chloroform extract was dried over anhydrous potassium carbonate, and then distilled under reduced pressure. The 1-carbobenzoxypiperazine distilled as a colorless liquid, B. P. 140–150°/1 mm. (mainly at 144–146°); yield 50.9 g. (46% of the theoretical amount).

A mixture of 34 g. of 1-carbobenzoxypiperazine prepared above and 17.9 g. of nitrourea in 200 ml. of water was heated on a steam bath. After 15 minutes gas evolution had ceased and an oil separated. On cooling, the oil solidified to a colorless solid which was removed by filtration and air-dried. The yield of 1-carbobenzoxy-4-carbamylpiperazine was 35.4 g. (85% of the theoretical amount). When crystallized from ethanol, colorless shiny plates were obtained, melting point 140.7°–141.5° C.

EXAMPLE 2

1-carbobenzoxy-4-carbamylpiperazine

The 1-carbobenzoxypiperazine prepared in Example 1 was converted to the hydrochloride salt by treatment with hydrochloric acid, and the compound was obtained as colorless crystals, melting point 155–156.5° C.

An iced solution of 97.4 g. of potassium cyanate in 200 ml. of water was added to a solution of 235 g. of 1-carbobenzoxypiperazine hydrochloride in 1 liter of water. The resulting solution was removed from the ice bath and within 5 minutes colorless crystals formed. After four and one-half hours the suspension was chilled, filtered, washed with iced water and dried, yielding 260 g. (89% of the theoretical amount) of 1-carbobenzoxy-4-carbamylpiperazine, melting point 138.5°–139.5° C. (sinters 137.5° C.).

EXAMPLE 3

1-carbobenzoxy-4-methylcarbamylpiperazine

Under anhydrous conditions, a solution of 112.6 g. (0.512 mole) of 1-carbobenzoxypiperazine in 100 ml. of dry benzene was added to a stirred, chilled solution of 29.8 g. (0.302 mole) of phosgene in 150 ml. of dry toluene during the course of 1 hour. After stirring at 0° for 1½ hours the precipitate was removed by filtration. The combined filtrate and washings was distilled under reduced pressure and the 1-carbobenzoxy-4-chlorocarbonylpiperazine distilled as a colorless liquid, undergoing a little decomposition, at 203–208°/1.3–1.5 mm.

To 50 ml. of a 25% aqueous solution of methylamine and excess ice was added, while stirring, a benzene-toluene solution of 0.12 mole of 1-carbobenzoxy-4-chlorocarbonylpiperazine. After one hour the reaction mixture was concentrated under reduced pressure to remove the excess methylamine, benzene and toluene. The residue, consisting of an oil and an aqueous solution, was acidified with a small amount of hydrochloric acid and on cooling the oil solidified. The solid was removed by filtration, washed with water and dried at 100° C., yielding 29.8 g. (90% of the theoretical amount) of 1-carbobenzoxy-4-methylcarbamylpiperazine. When crystallized from ethyl acetate, colorless crystals were obtained, melting point 120.0°–120.5° C.

EXAMPLE 4

1-carbobenzoxy-4-dimethylcarbamylpiperazine

A solution of 10.8 g. of dimethylcarbamyl chloride in 10 ml. of ethyl acetate was added, with stirring and cooling, to a chilled solution of 44 g. of 1-carbobenzoxypiperazine in 250 ml. of ethyl acetate. After one-half hour at 0° C., the reaction mixture was allowed to stand at room temperature overnight. The precipitate was removed by filtration, washed with ethyl acetate and dried, yielding 21.5 g. of colorless crystals of 1-carbobenzoxypiperazine hydrochloride. The filtrate was concentrated on a steam bath and the residual yellow oil was dissolved in chloroform, washed with N hydrochloric acid, 5% sodium bicarbonate and water and dried over anhydrous magnesium sulfate. The chloroform solution was distilled under reduced pressure and after the chloroform was removed the 1-carbobenzoxy-4-dimethylcarbamylpiperazine distilled as a viscous colorless liquid, boiling point 206°–207°/1.1 mm., 16.1 g. (55% of the theoretical amount).

EXAMPLE 5

1-carbobenzoxy-4-ethylcarbamylpiperazine

A solution of 0.11 mole of 1-carbobenzoxy-4-chlorocarbonylpiperazine in toluene was added to a stirred mixture of 25 ml. of 33% aqueous ethylamine and ice. After stirring 2 hours, the colorless crystals were removed by filtration, washed with iced water and dried at 100° C., yielding 22.3 g. of 1-carbobenzoxy-4-ethylcarbamylpiperazine, melting point 120°–123° C. Concentration of the filtrate gave an additional 6.6 g., bringing the total yield to 28.9 g. (90% of the theoretical amount). Recrystallization from ethyl acetate and from aqueous ethanol gave colorless crystals, melting point 126.0°–126.5° C.

EXAMPLE 6

*1-carbobenzoxy-4-n-propylcarbamylpiperazine*

To a cold mixture of 207 g. of a toluene solution of 0.236 mole of 1-carbobenzoxy-4-chlorocarbonylpiperazine and 100 ml. of ethyl acetate was added dropwise, with agitation, 32.3 g. of n-propylamine. On filtration, crystals were obtained which were triturated with dilute acid and washed with water, yielding 43.3 g. of colorless crystals of 1-carbobenzoxy-4-n-propylcarbamylpiperazine. Concentration of the mother liquor gave a solid which when crystallized from ethyl acetate, triturated with dilute acid and washed with water, yielded an additional 28.8 g. of product. Recrystallization from ethyl acetate yielded colorless crystals, melting point 112.5°–113.5° C.

EXAMPLE 7

*1-carbobenzoxy-4-isopropylcarbamylpiperazine*

Reaction of 0.122 mole of 1-carbobenzoxy-4-chlorocarbonylpiperazine with 0.294 mole of isopropylamine according to the procedure of Example 6 yielded 37.8 g. of crude 1-carbobenzoxy-4-isopropylcarbamylpiperazine. When recrystallized from ethyl acetate and from 50% ethanol, colorless crystals were obtained, melting point 118–119° C.

EXAMPLE 8

*1-carbobenzoxy-4-n-butylcarbamylpiperazine*

To an iced solution of 89 g. of a toluene solution of 0.1 mole of 1-carbobenzoxy-4-chlorocarbonylpiperazine in 250 ml. of ethyl acetate, 18.3 g. of n-butylamine was added in small portions, with shaking. After standing at room temperature overnight, 11.2 g. of n-butylamine hydrochloride was obtained by filtration and washing with ethyl acetate. The filtrate was concentrated to dryness and crystallization from ethyl acetate and petroleum ether gave 34.1 g. of crude 1-carbobenzoxy-4-n-butylcarbamylpiperazine. Recrystallization from ethyl acetate, 50% ethanol and ethyl acetate-ether gave colorless crystals, melting point 94.0°–95.5 C.

EXAMPLE 9

*1-carbobenzoxy-4-sec-butylcarbamylpiperazine*

Reaction of 0.1 mole of 1-carbobenzoxy-4-chlorocarbonylpiperazine with 0.25 mole of sec-butylamine according to the procedure of Example 8 gave 11.4 g. of crystals of sec-butylamine hydrochloride and 29.1 g. of crude 1-carbobenzoxy-4-sec-butylcarbamylpiperazine. Recrystallization from ether gave colorless crystals, melting point 58–59° C.

EXAMPLE 10

*1-carbobenzoxy-4-phenylcarbamylpiperazine*

A solution of 11.9 g. (0.1 mole) of phenyl isocyanate in 20 ml. of benzene was added, dropwise, to a stirred, chilled solution of 22 g. (0.1 mole) of 1-carbobenzoxypiperazine in 100 ml. of benzene. The mixture was refluxed for one hour, cooled and the resulting colorless crystals removed by filtration, washed with benzene, and dried. The yield of 1-carbobenzoxy-4-phenylcarbamylpiperazine was 32.3 g. (95% of the theoretical amount). When recrystallized from benzene and absolute ethanol, colorless crystals were obtained, melting point 139.5°–140.0° C.

EXAMPLE 11

*1-carbobenzoxy-4-phenylcarbamylpiperazine*

A mixture of 41.7 g. of a toluene solution of 0.1 mole of 1-carbobenzoxy-4-chlorocarbonylpiperazine, 9.3 g. (0.1 mole) of aniline, and 25 ml. of 4 N sodium hydroxide was shaken in a stoppered flask for 22 hours. The reaction mixture was then acidified with hydrochloric acid and the aqueous layer was decanted. The organic layer was diluted with 20–40° ligroin and the colorless crystals were removed by filtration, washed with 20°–40° ligroin, washed with water and air-dried. The yield of 1-carbobenzoxy-4-phenylcarbamylpiperazine was 27.2 g. (80% of the theoretical amount). Recrystallization from absolute ethanol and benzene gave colorless crystals, melting point 139°–140° C.

EXAMPLE 12

*1-carbobenzoxy-4-o-chlorophenylcarbamylpiperazine*

A solution of 15.4 g. (0.1 mole) of o-chlorophenyl isocyanate in 25 ml. of benzene was added to a cold solution of 22 g. (0.1 mole) of 1-carbobenzoxypiperazine in 100 ml. of benzene and the resulting solution, which slowly deposited crystals, was allowed to stand at room temperature overnight. The colorless crystals were removed by filtration and air-dried. The yield of 1-carbobenzoxy-4-o-chlorophenylcarbamylpiperazine was 35.4 g. (95% of the theoretical amount). When recrystallized from benzene and absolute ethanol, colorless crystals were obtained, melting point 118.5°–119.5° C.

EXAMPLE 13

*1-carbobenzoxy-4-p-phenetylcarbamylpiperazine*

A solution of 16.3 g. (0.1 mole) of p-phenetyl isocyanate in 25 ml. of benzene was added to a solution of 22 g. (0.1 mole) of 1-carbobenzoxypiperazine in 100 ml. of benzene. After 4 hours at room temperature the suspension was heated to boiling and then cooled. The colorless crystals were removed by filtration and air-dried. The yield of 1-carbobenzoxy-4-p-phenetylcarbamylpiperazine was 29 g. (76% of the theortical amount). The product was recrystallized from absolute ethanol, yielding colorless crystals, melting point 147.0°–148.0° C.

EXAMPLE 14

*1-carbobenzoxy-4-m-tolylcarbamylpiperazine*

A solution of 13.3 g. (0.1 mole) of m-tolyl isocyanate in 25 ml. of benzene was added to a solution of 22 g. (0.1 mole) of 1-carbobenzoxypiperazine in 100 ml. of benzene, with cooling. After 3 days at room temperature, the mixture was heated to boiling, filtered to remove a small amount of precipitate and concentrated under reduced pressure to dryness. The yield of colorless 1-carbobenzoxy-4-m-tolylcarbamylpiperazine was 34.8 g. (99% of the theoretical amount). When recrystallized from absolute ethanol, colorless crystals were obtained, melting point 136.0°–136.5° C.

EXAMPLE 15

*1-carbobenzoxy-4-cyclohexylcarbamylpiperazine*

To 88 g. of an iced toluene solution of 0.1 mole of 1-carbobenzoxy-4-chlorocarbonylpiperazine in 250 ml. of ethyl acetate, 24.8 g. (0.25 mole) of cyclohexylamine was added, in portions, with shaking. After 2 hours at room temperature, the resulting colorless crystals were removed by filtration, washed with ethyl acetate, air-dried and washed with water to remove the cyclohexylamine hydrochloride, yielding 11.8 g. of crude 1 - carbobenzoxy - 4 - cyclohexylcarbamylpiperazine. The ethyl acetate mother liquor was concentrated to dryness under reduced pressure, yielding an additional 25.3 g. of colorless product. When recrystallized from ethyl acetate and 60% aqueous ethanol, colorless crystals were obtained, melting point 118°–119° C.

EXAMPLE 16

*1 - carbobenzoxy - 4 - benzylcarbamylpiperazine*

A mixture of 20 g. (0.0785 mole) of phenylacethydroxamic acid benzoate, 45.2 g. (0.205 mole) of 1-carbobenzoxypiperazine, and 100 ml. of water was heated on a steam bath for 10 minutes. The mixture became cloudy and an oil separated. The mixture was diluted with 225 ml. of water, chilled and acidified with concentrated hydrochloric acid and the resulting nearly colorless precipitate was removed by filtration and washed with dilute hydrochloric acid. The precipitate was warmed with aqueous sodium bicarbonate and the cream-colored precipitate was removed by filtration, washed with water and dried at 100° C. The yield of crude 1-carbobenzoxy-4-benzylcarbamylpiperazine was 21 g. (76% of the theoretical amount). Recrystallization from absolute ethanol gave colorless crystals, melting point 134°–135° C.

EXAMPLE 17

*1 - carbobenzoxy - 4 - thiocarbamylpiperazine*

A cold solution of 10.7 g. (0.11 mole) of potassium thiocyanate in 10 ml. of water was added to a cold solution of 25.7 g. (0.1 mole) of 1-carbobenzoxypiperazine hydrochloride in 38 ml. of water. After 5 hours at room temperature the solution was concentrated under reduced pressure and the residue was diluted with ethyl acetate and filtered to remove the precipitated potassium chloride. The ethyl acetate filtrate was concentrated, yielding 17.4 g. (62% of the theoretical amount) of colorless crystals of 1-carbobenzoxy - 4 - thiocarbamylpiperazine. When recrystallized from ethyl acetate, colorless crystals were obtained, melting point 83.5°–86.0° C.

EXAMPLE 18

*1 - carbobenzoxy - 4 - guanylpiperazine sulfate*

A mixture of 26.4 g. (0.12 mole) of 1-carbobenzoxypiperazine 13.9 g. (0.05 mole) of S-methyl isothiourea sulfate and 50 ml. of 65% ethanol was refluxed for 9 hours, at which time the evolution of methyl mercaptan had ceased. The solution was concentrated under reduced pressure and the residual glassy resin was converted to a granular solid by trituration with ether. The solid was crystallized from absolute ethanol and aqueous ethanol, yielding 10.7 g. (35% of the theoretical amount) of colorless crystals of 1-carbobenzoxy-4-guanylpiperazine sulfate, melting point 227° C. (with decomposition).

I claim:

1. 1-carbobenzoxy-4-carbamylpiperazine.
2. 1 - carbobenzoxy - 4 - methylcarbamylpiperazine.
3. 1 - carbobenzoxy - 4 - ethylcarbamylpiperazine.
4. 1 - carbobenzoxy - 4 - n - propylcarbamylpiperazine.
5. 1 - carbobenzoxy -4 - cyclohexylcarbamylpiperazine.
6. Compounds having the general formula:

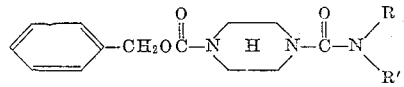

in which R is a member of the group consisting of hydrogen and lower alkyl radicals, R' is a member of the group consisting of hydrogen, lower alkyl, monocyclic aryl and cyclohexyl radicals.

7. A 1-carbobenzoxy - 4 - lower alkylcarbamylpiperazine.

LEON GOLDMAN.

No references cited.